United States Patent
Stratton et al.

(10) Patent No.: US 9,228,321 B1
(45) Date of Patent: Jan. 5, 2016

(54) SYSTEM AND METHOD FOR ADJUSTING THE OPERATION OF A MACHINE

(71) Applicant: Caterpillar Inc., Peoria, IL (US)

(72) Inventors: Kenneth L. Stratton, Dunlap, IL (US); Daniel K. Dunn, Dunlap, IL (US); Brian G. Funke, Peoria, IL (US); Seth J. Redenbo, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/484,735

(22) Filed: Sep. 12, 2014

(51) Int. Cl.
| | |
|---|---|
| *G01C 22/00* | (2006.01) |
| *E02F 9/20* | (2006.01) |
| *G05D 1/02* | (2006.01) |
| *G06K 9/00* | (2006.01) |
| *G01S 13/72* | (2006.01) |
| *G07C 9/00* | (2006.01) |
| *B60R 21/00* | (2006.01) |
| *G06K 9/62* | (2006.01) |
| *B60R 21/0134* | (2006.01) |
| *G06K 9/46* | (2006.01) |
| *G08C 19/00* | (2006.01) |
| *B61L 3/00* | (2006.01) |
| *B61C 17/12* | (2006.01) |
| *G01S 13/88* | (2006.01) |
| *B60R 22/00* | (2006.01) |
| *G01S 13/93* | (2006.01) |
| *B60R 21/16* | (2006.01) |
| *G06T 7/00* | (2006.01) |

(52) U.S. Cl.
CPC .............. *E02F 9/205* (2013.01); *G05D 1/0276* (2013.01); *B60R 21/00* (2013.01); *B60R 21/0134* (2013.01); *B60R 21/16* (2013.01); *B60R 22/00* (2013.01); *B61C 17/12* (2013.01); *B61L 3/006* (2013.01); *G01S 13/723* (2013.01); *G01S 13/88* (2013.01); *G01S 13/931* (2013.01); *G06K 9/00624* (2013.01); *G06K 9/46* (2013.01); *G06K 9/62* (2013.01); *G06T 7/0004* (2013.01); *G07C 9/00182* (2013.01); *G07C 9/00563* (2013.01); *G08C 19/00* (2013.01)

(58) Field of Classification Search
CPC ............ H02J 7/00; H02J 7/0004; H04Q 7/32; H04W 88/02; E02F 9/205; G04C 19/00; B60R 21/0134; G06K 9/46; G01S 13/88; B61C 17/12

See application file for complete search history.

(56) References Cited

U.S. PATENT DOCUMENTS

| | | |
|---|---|---|
| 5,551,524 A | 9/1996 | Yamamoto et al. |
| 5,864,970 A | 2/1999 | Maddock et al. |
| 6,167,336 A | 12/2000 | Singh et al. |
| 6,445,310 B1 | 9/2002 | Bateman et al. |
| 6,845,311 B1 | 1/2005 | Stratton et al. |
| 7,216,033 B2 | 5/2007 | Flann et al. |
| 7,578,079 B2 | 8/2009 | Furem |

(Continued)

*Primary Examiner* — Behrang Badii
(74) *Attorney, Agent, or Firm* — Leydig, Voit & Mayer, Ltd.

(57) ABSTRACT

A system for remotely operating a machine includes a plurality of remote control input devices including a propulsion input device. A controller generates an operator generated propulsion command to propel the machine and generates continued propulsion commands to continue to propel the machine without additional propulsion signals from a propulsion input device. The controller determines an interval since the generation of a previous remote input signal at the remote control unit and generates a change in operation command signal if the interval since the generation of the previous remote input signal exceeds an input signal absence threshold.

20 Claims, 5 Drawing Sheets

(56) References Cited

U.S. PATENT DOCUMENTS

| | | |
|---|---|---|
| 7,734,398 B2 | 6/2010 | Manneppalli |
| 7,979,175 B2 | 7/2011 | Allard et al. |
| 8,073,584 B2 | 12/2011 | Marty et al. |
| 8,139,108 B2 | 3/2012 | Stratton et al. |
| 8,351,684 B2 | 1/2013 | Clar et al. |
| 8,456,327 B2 | 6/2013 | Bechtel et al. |
| 8,527,151 B2 * | 9/2013 | Le ................ B60R 21/0134 180/268 |
| 8,620,535 B2 | 12/2013 | Friend et al. |
| 8,873,837 B2 * | 10/2014 | Jahanshahi ........ G06K 9/00624 382/155 |
| 2007/0129869 A1 | 6/2007 | Gudat et al. |
| 2008/0180523 A1 | 7/2008 | Stratton et al. |
| 2009/0043462 A1 | 2/2009 | Stratton et al. |
| 2009/0202109 A1 | 8/2009 | Clar et al. |
| 2010/0250023 A1 | 9/2010 | Gudat |
| 2011/0043328 A1 * | 2/2011 | Bassali .............. G07C 9/00182 340/5.71 |
| 2011/0093171 A1 | 4/2011 | Saposnik |
| 2012/0089293 A1 | 4/2012 | Halder et al. |
| 2012/0139325 A1 | 6/2012 | Norberg et al. |
| 2012/0154572 A1 | 6/2012 | Stratton et al. |
| 2012/0215378 A1 | 8/2012 | Sprock et al. |
| 2014/0012404 A1 | 1/2014 | Taylor et al. |
| 2014/0032030 A1 | 1/2014 | Stratton et al. |
| 2014/0032058 A1 | 1/2014 | Stratton et al. |
| 2014/0032132 A1 | 1/2014 | Stratton et al. |
| 2014/0094998 A1 * | 4/2014 | Cooper .................. B61L 3/006 701/2 |

* cited by examiner

SYSTEM AND METHOD FOR ADJUSTING THE OPERATION OF A MACHINE

TECHNICAL FIELD

This disclosure relates generally to controlling a machine and, more particularly, to a system and method for adjusting the operation of a remotely controlled machine based upon intervals between the generation of remote control signals.

BACKGROUND

Machines such as dozers, motor graders, wheel loaders, etc., are used to perform a variety of tasks. For example, these machines may be used to move material at a work site. The machines may operate in an autonomous, semi-autonomous, or manual manner to perform these tasks as part of a work plan. The machines may receive instructions in accordance with the work plan to perform operations including digging, loosening, carrying, etc., different materials at the work site such as those related to mining, earthmoving and other industrial activities.

In some instances, machines may be operated by remote control but include a semi-autonomous aspect in that an operator may initiate an operation and the machine will continue the operation semi-autonomously without additional input. For example, an operator may initiate propulsion of a machine by displacing a joystick and the machine will continue to move until the operator alters the instructions by displacing the joystick again or performing some other task. If, however, the operator fails to alter the instructions, the machine may continue to operate which may potentially result in the machine moving to a undesired location or performing undesired tasks U.S. Pat. No. 7,979,175 discloses a system for interrupting autonomous operation of a machine if a disassociation between the autonomous operation and an operator input is detected. In some situations, the autonomous operation is resumed after the operator input is terminated.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for remotely operating a machine includes a remote control unit located remote from the machine having a plurality of remote control input devices for generating a plurality of remote input signals. One of the plurality of remote control input devices is a propulsion input device for generating a propulsion signal. A transmitter remote from the machine transmits the plurality of remote input signals and a receiver at the machine for receiving a plurality of remote input signals. A controller is configured to store an input signal absence threshold, generate an operator generated propulsion command to propel the machine based upon the propulsion signal from the propulsion input device, and generate continued propulsion commands based upon the operator generated propulsion command to continue to propel the machine without receiving additional propulsion signals from the propulsion input device. The controller is further configured to determine an interval since generating a previous remote input signal at the remote control unit and generate a change in operation command signal upon the interval since generating the previous remote input signal exceeding the input signal absence threshold.

In another aspect, a controller-implemented method of remotely operating a machine includes storing an input signal absence threshold, generating an operator generated propulsion command to propel the machine based upon a propulsion signal from a propulsion input device of a remote control unit located remote from the machine, and generating continued propulsion commands based upon the operator generated propulsion command to continue to propel the machine without receiving additional propulsion signals from the propulsion input device. The method further includes determining an interval since generating a previous remote input signal with any of a plurality of remote control input devices at the remote control unit and generating a change in operation command signal upon the interval since generating the previous remote input signal exceeding the input signal absence threshold.

In still another aspect, a machine includes a drivetrain for causing movement of the machine and a receiver for receiving a plurality of remote input signals. A remote control unit located remote from the machine has a plurality of remote control input devices for generating a plurality of remote input signals and a transmitter that transmits the plurality of remote input signals. One of the plurality of remote control input devices is a propulsion input device for generating a propulsion signal. A controller is configured to store an input signal absence threshold, generate an operator generated propulsion command to propel the machine based upon the propulsion signal from the propulsion input device, and generate continued propulsion commands based upon the operator generated propulsion command to continue to propel the machine without receiving additional propulsion signals from the propulsion input device. The controller is further configured to determine an interval since generating a previous remote input signal at the remote control unit and generate a change in operation command signal upon the interval since generating the previous remote input signal exceeding the input signal absence threshold.

DETAILED DESCRIPTION

Figure 1:
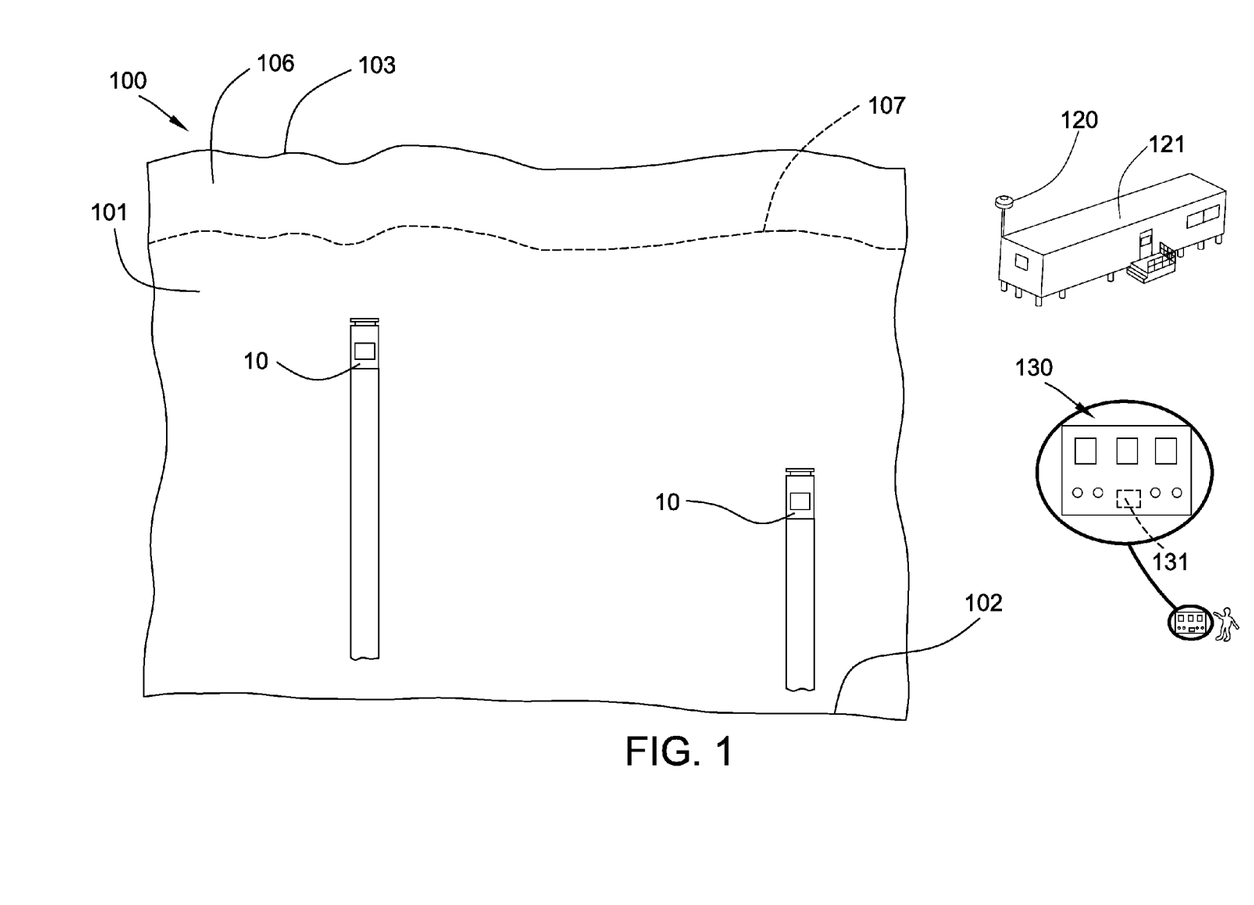
FIG. 1 depicts a schematic illustration of a work site at which a system incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

Machine 10 may be configured to move material at the work site 100 according to one or more material movement plans from an initial location such as near the high wall 102 to a spread or dump location such as at crest 103. The material movement plans may include, among other things, forming a plurality of spaced apart channels or slots 110 that are cut into the work surface 104 at work site 100 along a path generally from the high wall 102 to the crest 103. In doing so, each machine 10 may move back and forth along a linear path generally between the high wall 102 and the crest 103.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
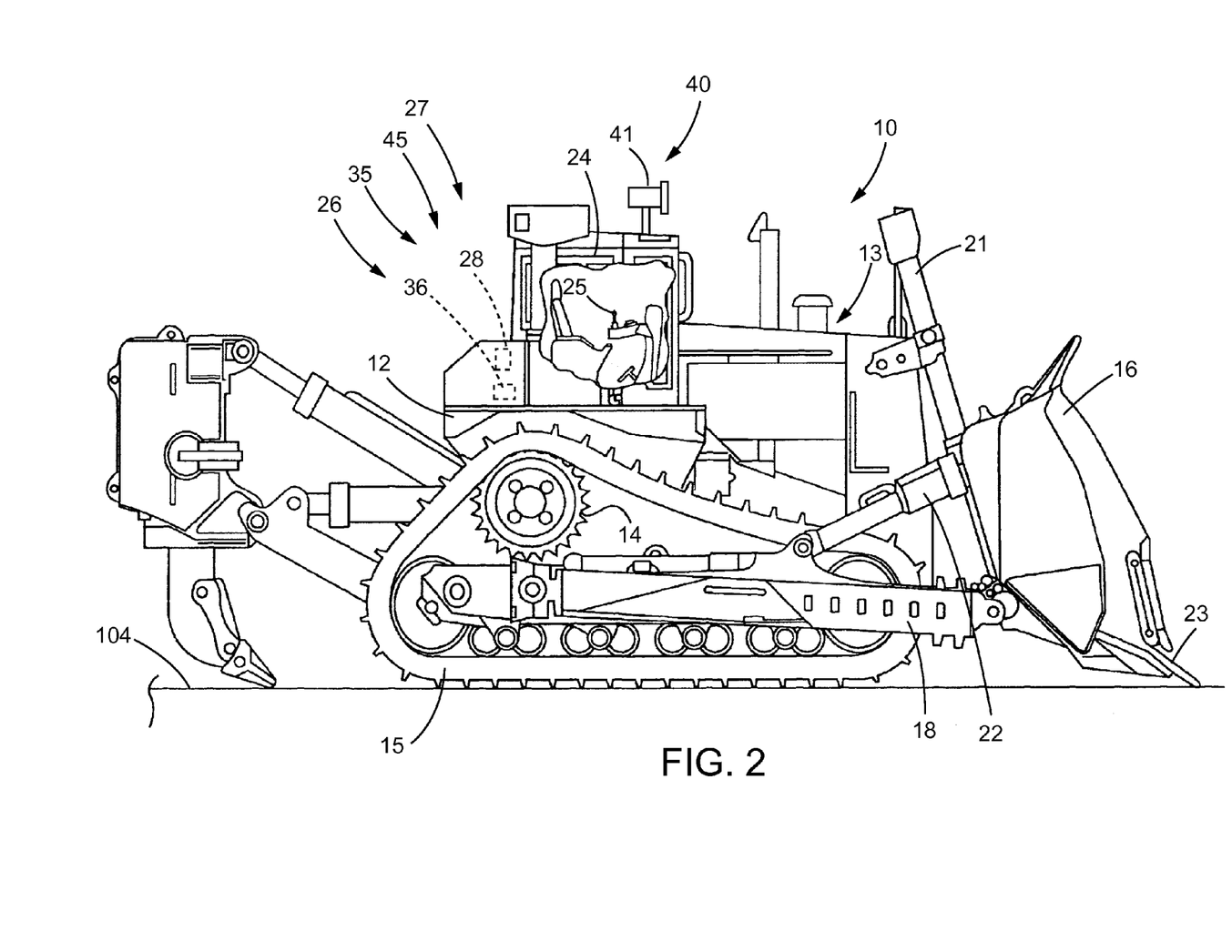
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured for pushing material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 120 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 121 (FIG. 1) or at a remote control unit 130. The functionality of control system 35 may be distributed so that certain functions are performed at machine 10 and other functions are performed remotely. In such case, the control system 35 may include a communications system such as wireless communications system 120 for transmitting signals between the machine 10 and a system located remote from the machine. In one embodiment, remote control unit 130 positioned remote from the machine 10 may provide some or all of the specific commands that are then transmitted by the wireless communications system 120 to systems of the machine.

Machine 10 may be configured to be operated autonomously, semi-autonomously, or manually. When operating semi-autonomously or manually, the machine 10 may be operated by remote control and/or by an operator physically located within the cab 24.

When operating the machine 10 via a remote control system, a portion of the control system 35 may be located at the remote control unit 130. Accordingly, machine 10 may include a machine controller 37 and remote control unit 130 may include a remote unit controller 131. The machine controller 37 and the remote unit controller 131 may be components of controller 36.

Figure 4:
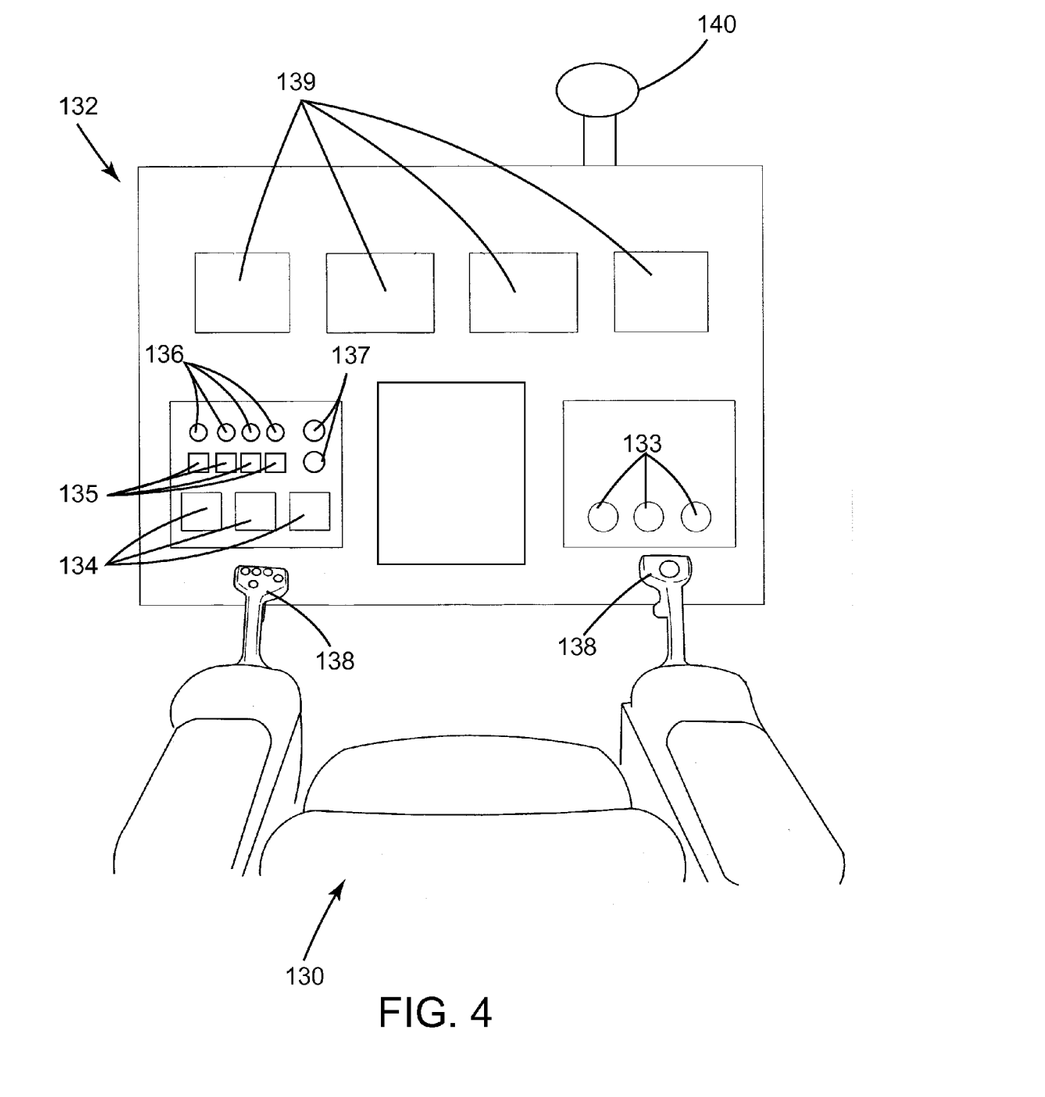
FIG. 4 depicts a schematic illustration of a portion of a remote control unit in accordance with the disclosure.

Referring to FIG. 4, in one example, the remote control unit 130 may be configured with an instrument array 132 and controls similar to that of the machine 10 with a plurality of gauges 133, displays 134, and input devices such as buttons 135, knobs 136, dials 137, levers such as joysticks 138, and other controls. The remote control unit 130 may also include a point of view display 139 that includes one or more displays upon which visual images from a visual image system 40 may be displayed to depict a point of view relative to machine 10. The point of view display 139 may be used to display images depicting the front, the left side, and the right side of machine 10. If desired, additional images of other points of view may be displayed such as behind the machine 10 or views of other aspects of the machine such as the blade 16. Signals from the various sensors on the machine 10 may be transmitted directly or indirectly to the remote control unit 130 and displayed on the instrument array. If desired, the remote control unit 130 may be configured in a manner similar to the actual cab 24 of the machine 10.

Remote control unit 130 may also include an eye position sensor 140 for monitoring the direction of focus of an operator's eyes. The controller 36 may be configured to monitor the position of the operator's eyes to determine whether it is likely that the operator is exercising control over the machine 10 by focusing on the point of view display 139 or another desired area of the remote control unit 130. If the operator's eyes are focused on predetermined areas for a time period that exceeds a desired threshold, the controller 36 may generate positive eye position signals.

When operating machine 10 by remote control, the machine 10 and the remote control unit 130 may communicate via the wireless communications system 120. Each of the machine 10 and the remote control unit 130 may include wireless communication devices to permit wireless transmission of a plurality of data signals between the machine and the remote control unit as well as permit communication with other systems remote from the machine and the remote control unit.

Figure 3:
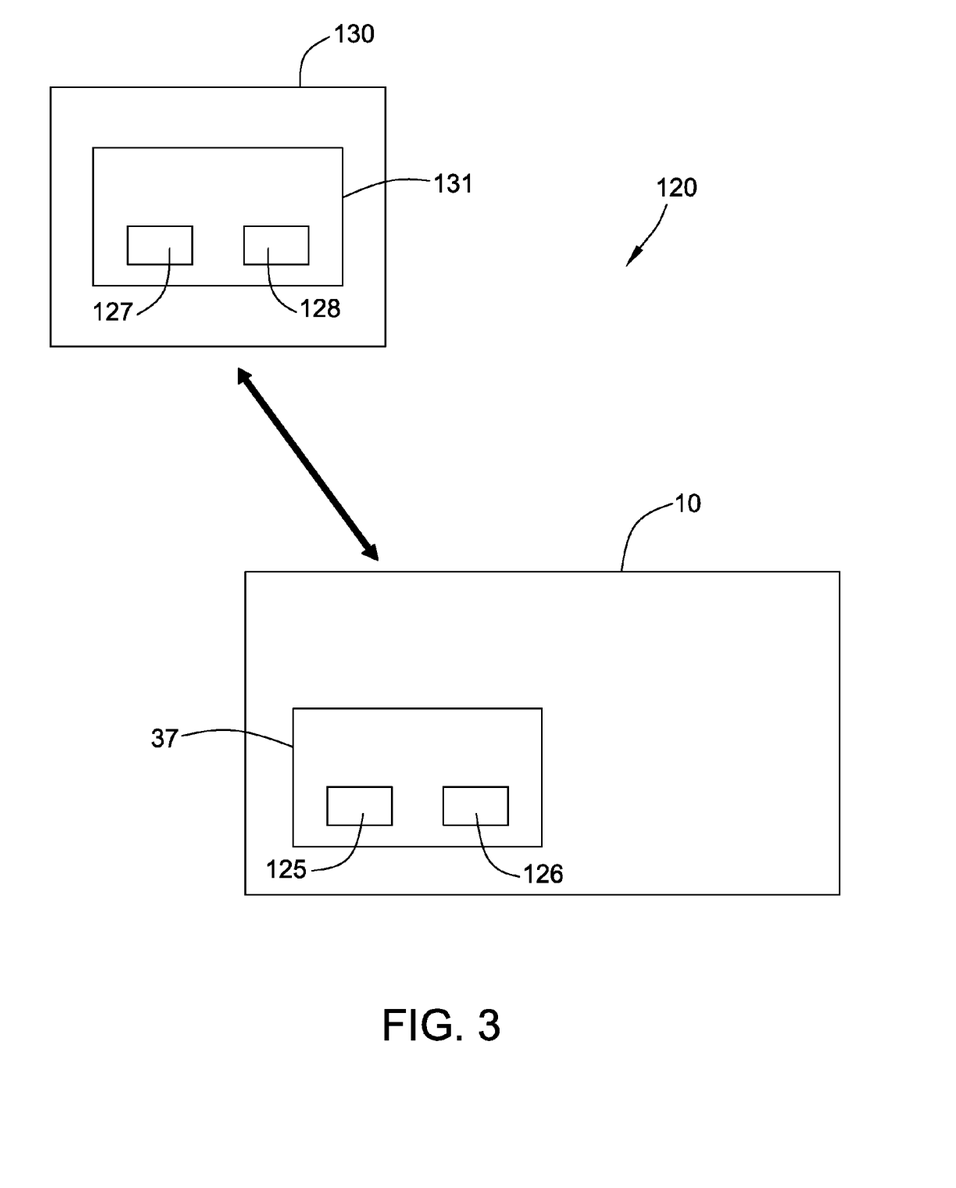
FIG. 3 depicts a schematic illustration of a wireless communications system in accordance with the disclosure.

As depicted in FIG. 3, machine 10 may include machine transmitter 125 and a machine receiver 126. The remote control unit 130 may include a remote control transmitter 127 and a remote control receiver 128. The transmitters and receivers may be a portion of the respective machine controller 37 and the remote unit controller 131, if desired. In operation, signals transmitted by the remote control unit 130 may be generated by the remote unit controller 131 and then transmitted by the remote control transmitter 127 to the machine receiver 126 and then processed by machine controller 37. Signals transmitted from the machine 10 to the remote control unit 130 may be generated by the machine controller 37 and then transmitted by the machine transmitter 125 to the remote control receiver 128 and then processed by remote unit controller 131.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 1 indicating association with the machine 10, may include a position sensor 28, also shown generally by an arrow in FIG. 1 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

The machine 10 may include a visual image system 40 such as a camera system for generating visual images indicative of a point of view relative to the machine 10. The visual image system 40 may include a plurality of visual image sensors such as cameras 41 for generating visual image signals. The visual image signals may be transmitted wirelessly to a system remote from machine 10. The plurality of cameras 41 of the visual image system 40 may be positioned to capture different views that an operator would have from within the cab 24 of machine 10. If desired, a plurality of cameras 41 may also be positioned to provide a point of view including the machine 10 and/or the blade 16 as well as a portion of the work site 100 at which the machine is operating. The visual image system 40 may be desirable in a plurality of instances including when operating the machine 10 remotely via a remote control unit 130 (FIG. 1), when the visibility of an operator within the cab 24 is limited, or when personnel remote from the machine desire to observe the operation of the machine such as when the machine is operating autonomously.

In some embodiments, control system 35 may be configured to propel the machine 10 without constant input or additional propulsion signals from the remote control unit 130. In doing so, a remote control operator may provide propulsion instructions through an input device such as joystick 138 and then release the input device. The controller 36 is configured to automatically continue to generate propulsion commands consistent with or based upon the original propulsion instructions until the operator provides other instructions such as increasing or decreasing the speed of the machine 10. The machine 10 may thus be propelled in a desired direction without receiving additional propulsion commands until receiving additional instructions from the remote control operator to stop or alter its movement. For example, rather than requiring an operator to continue actuation or displacement of joystick 25 in a forwardly displaced position to maintain the machine's forward movement, the control system 35 may be configured to generate continued propulsion commands to propel the machine 10 at a constant rate based upon the initial operator generated propulsion command until a new operator generated propulsion signal is generated. The new operator generated propulsion signal may be any type of input signal including one to increase or decrease the speed or, in some instances, a change the direction of propulsion.

More specifically, with such configuration, a remote control operator may displace a propulsion input device such as joystick 138 and the remote unit controller 131 may generate a propulsion signal indicative of a desired movement of the machine 10. In one embodiment, the remote control transmitter 127 may transmit the propulsion signal to the machine receiver 126 at machine 10. The machine controller 37 may generate an operator generated propulsion command based upon the propulsion signal to propel the machine 10. In another embodiment, the remote unit controller 131 may generate an operator generated propulsion command based upon the propulsion signal and transmit the propulsion command to the machine 10 via the remote control transmitter 127. If the operator provides new instructions by displacing the joystick 138 to increase or decrease the speed or change the direction of the machine 10, the remote unit controller 131 may generate a new propulsion signal indicative of the new instructions that is then transmitted to the machine 10. In the absence of new propulsion signals from joystick 138, the controller 36 may generate continued propulsion commands based upon the operator generated propulsion command to continue to propel the machine 10 at a constant rate. The continued propulsion commands may be generated at the machine 10 by the machine controller 37, at the remote control unit 130 by the remote unit controller 131, or at any other location by any other component of controller 36.

In order to reduce the likelihood that a machine 10 will move into an unintended area or move in an unintended manner while controller 36 is generating continued propulsion commands based upon the operator generated propulsion command, the control system 35 may include a signal interval measurement system 45 as shown generally by an arrow in FIG. 2 that monitors the generation of certain remote signals by the remote control unit 130 and stops or reduces movement of the machine 10 if those remote input signals are not generated within a predetermined input signal absence threshold. More specifically, the signal interval measurement system 45 may monitor the interval between actions by an operator such as input instructions or other contact with the remote control unit 130 that would indicate that an operator is exercising sufficient control over the machine 10. If the machine 10 is being propelled based upon a propulsion command from the remote control unit 130 and the remote control unit 130 does not generate an input signal or another desired signal within a signal input absence threshold stored within the controller 36, the signal interval measurement system 45 may generate a change in operation command to stop the machine and/or take any other desired action.

The signal interval measurement system 45 may be configured to monitor certain types of input, commands, or actions at the remote control unit 130 that would indicate that the operator is exercising sufficient control over the machine 10. In some instances, this may require a specific action or input by the operator such as moving a joystick 138 or another input device (e.g., a pedal) in a particular manner. In other instances, the signal interval measurement system 45 may be configured to recognize the operation of any of a plurality of remote control input devices such as moving a joystick 138, pressing a button 135, turning a dial 137, or manipulating any other remote control input device. In addition, the remote control unit 130 may include an eye position sensor 140 to monitor whether the operator is looking at the point of view display 139.

The signal interval measurement system 45 may also be configured to monitor the eye movement of the operator to determine whether the operator is exercising sufficient control over the machine. If the operator's eyes are focused on predetermined areas for a time period that exceeds a desired threshold, the controller 36 may generate a positive eye position signal. The controller 36 may be configured to respond to the receipt or generation of the positive eye position signal as the generation of a remote input signal and thus maintain propulsion of machine 10.

In one embodiment, the signal interval measurement system 45 may be configured to measure the time interval between an input operation at or contact with the remote control unit 130. In such case, the controller 36 may be configured to store one or more input signal absence thresholds that are time based. If the interval between the input operation at or contact with the remote control unit 130 exceeds the input signal absence threshold, the signal interval measurement system 45 may generate a change in operation command which may change the operation of the machine 10 in a desired manner.

Control system 35 may thus be configured so that when a machine 10 is being operated by remote control, it will continue to be propelled based upon a previous operator generated propulsion command (i.e., semi-autonomously) until it either receives an appropriate new operated generated propulsion command from the remote control operator to stop or change the machine's movement or the signal interval measurement system 45 determines that the remote control operator is not exercising sufficient control over the machine and the controller 36 stops or otherwise changes the operation of the machine. Once the signal interval measurement system 45 determines that the remote control operator is not exercising sufficient control over the machine 10 (e.g., the interval between an operator input operation at or contact with the remote control unit 130 exceeds the input signal absence threshold), the controller 36 may take any of a plurality of actions.

In one example, the controller 36 may generate a change in operation command signal that causes the machine 10 to stop. In another example, the change in command signal may cause the machine 10 to reduce speed. The reduction in speed may slow the machine 10 by a predetermined percentage of the original speed and may gradually slow the machine so that it eventually stops if an operator input operation at or contact with the remote control unit 130 does not occur within a second input signal absence threshold.

In another embodiment, the controller 36 may be configured to change the operation of other systems of the machine 10 if the interval between an input operation at or contact with the remote control unit 130 exceeds the input signal absence threshold. For example, if the work site 100 includes automated or autonomous systems that control the machine 10 based upon input from machine sensors 26, the sensitivity of the systems may change once the input signal absence threshold is exceeded. In one example, machine 10 may include a change in terrain system or another similar system that detects large or unexpected changes in the topography of the work surface 104. Such change in terrain system may be configured to stop the machine automatically upon detecting a change in terrain that exceeds a predetermined change in terrain threshold. The controller 36 may be configured to change (e.g., reduce) the degree to which a change in terrain is acceptable once the input signal absence threshold is exceeded.

The length of the input signal absence threshold may be influenced or changed by one or more parameters including the operating conditions of the machine 10 and the location of the machine within the work site 100. Accordingly, the input signal absence threshold may vary or change depending upon the operation being performed by the machine (i.e., the mode of operation of the machine). The length of the absence of an input signal may be more critical in some locations as compared to others or while performing some operations. For example, if the machine 10 is a dozer moving material within a first operating zone such as towards crest 103 but is still a significant distance from the crest, the input signal absence threshold may be relatively large. If, however, the machine 10 is within a second operating zone such as within a crest zone 106 relatively close to the crest 103, the input signal absence threshold may be substantially shorter to minimize the likelihood that the machine will move too close to the crest 103. In another example, the input signal absence threshold may change depending on whether the machine 10 is traveling forwards or backwards.

In still another embodiment, since the speed of the machine 10 may vary, the input signal absence threshold may be a function of the distance that the machine 10 has traveled rather than a function of time. As such, the input signal absence threshold may be distance based and be expressed as a distance rather than a time In a manner similar to that described above with respect to input signal absence thresholds expressed with respect to time, in some instances, the distances of the input signal absence thresholds may be a function of the position of the machine 10 within the work site 100 or the operation being performed. For example, machine 10 may be permitted to move a larger distance before reaching the input signal absence threshold when the machine is a significant distance away from any obstacles and the input signal absence threshold may be substantially smaller or shorter when the machine is near certain obstacles such as crest 103. Still further, the input signal absence threshold may also be velocity based.

Figure 5:
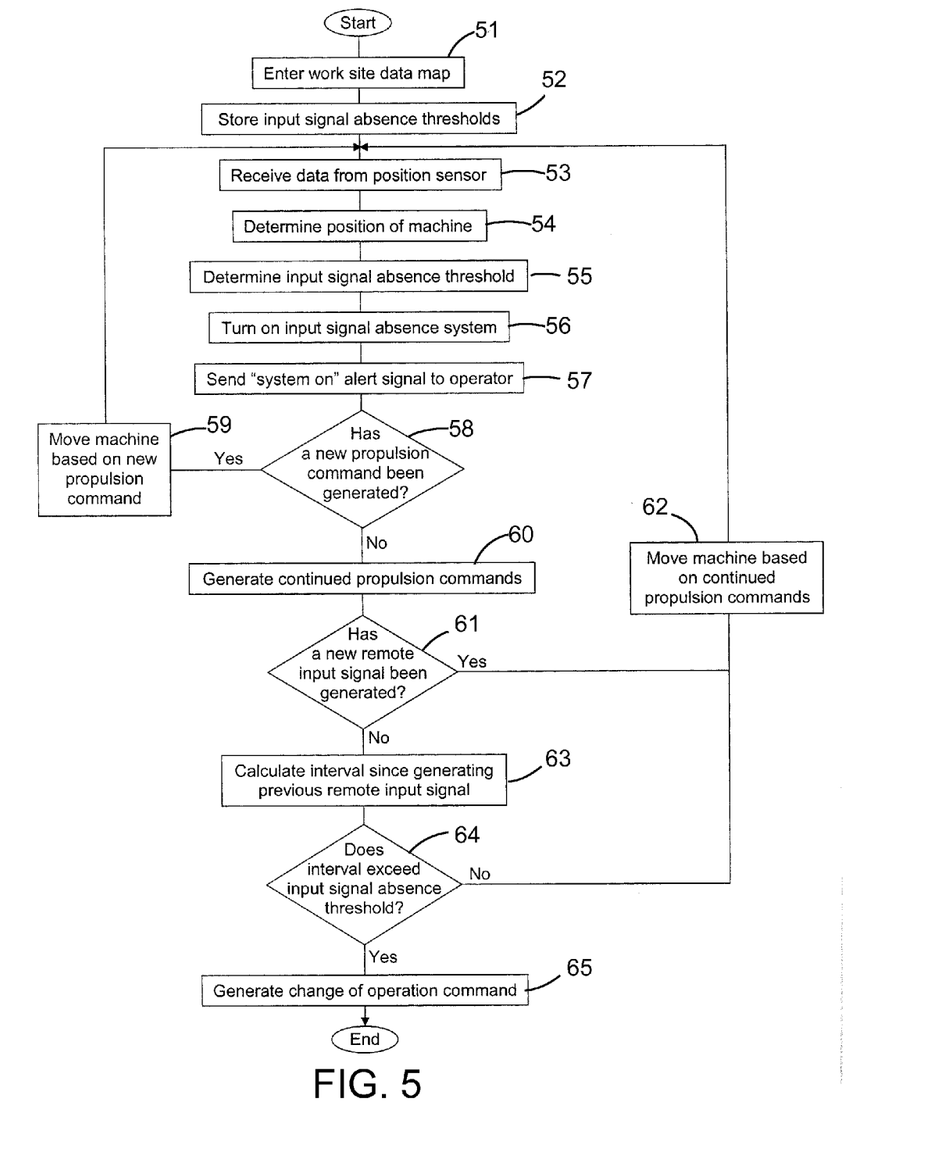
FIG. 5 depicts a flowchart illustrating a remote operation process in accordance with the disclosure.

Referring to FIG. 5, a flowchart of the operation of the machine 10 by remote control is depicted. At stage 51, an electronic map of the work site 100 may be entered into controller 36. The electronic map may include the position of controlled areas such as crest 103 at which different input signal absence thresholds may be utilized. The electronic map may be generated in any desired manner including moving machines autonomously about the work site 100. In an alternative step, an operator may manually operate machine 10, either from within the cab 24 of the machine or by remote control, and the topography of the work site recorded. In still another alternate embodiment, an electronic map of the work site 100 may be determined by moving a mapping vehicle (not shown) about the work site.

At stage 52, an input signal absence threshold may be stored or set within controller 36. More than one input signal absence threshold may be stored or set within controller 36 if desired. At stage 53, the controller 36 may receive data in the form of position signals from the position sensor 28. The controller 36 may use the position signals from the position sensor 28 to determine at stage 54 the position of machine 10.

The controller 36 may also use the position of machine 10 to update the topography of the work site 100 stored with the electronic map.

At stage 55, the input signal absence threshold may be determined. In instances in which a plurality of input signal absence thresholds have been stored, the controller 36 may use the position of the machine 10 or any other desired factor to determine the appropriate or desired input signal absence threshold. If only a single signal absence threshold is to be used, such input signal absence threshold may be selected by management personnel, or machine operator, or other personnel. If only a single input signal absence threshold has been stored within controller 36, stage 54 may be omitted.

In some embodiments, the signal interval measurement system 45 may be turned on or activated at stage 56 by engaging a switch or another input device at the remote control unit 130. In an alternate embodiment, the signal interval measurement system 45 may be activated automatically based upon the position of the machine 10 at the work site 100. The controller may send at stage 57 a "system on" alert signal to the operator to indicate activation of the signal interval measurement system 45. In one embodiment, the alert signal may turn on an indicator light.

During the operation, the remote control operator may manipulate input devices such as joystick 25 of the remote control unit 130 in a desired manner to operate the machine 10 and thus generate an operator generated propulsion command. In doing so, movement of an input device such as joystick 138 may create a propulsion signal. In one embodiment, the remote unit controller 131 may transmit the propulsion signal via the wireless communications system 120 to the machine 10 and the machine controller 37 may generate the operator generated propulsion command. In another embodiment, the remote unit controller 131 may generate the operator generated propulsion command and transmit the propulsion command via the wireless communications system 120 to the machine 10 and the machine controller 37 may implement the propulsion command. Other manners of generating the operator generated propulsion command may be implemented if desired.

At decision stage 58, the controller 36 may determine whether a new operator generated propulsion command has been generated at the remote control unit 130 by an operator moving an input device such as joystick 138. If a new operator generated propulsion command has been generated, the machine 10 may be moved at stage 59 based upon the operator generated propulsion command.

If a new operator generated propulsion command has not been generated at decision stage 58, the controller 36 may generate continued propulsion commands based upon the operator generated propulsion command. The continued propulsion commands may be identical to the operator generated propulsion command, if desired.

At decision stage 61, the controller 36 may monitor machine 10 to determine whether a new remote input signal has been generated at the remote control unit 130. In some embodiments, any remote input signal may be sufficient to establish that the remote control operator is exercising sufficient control over the machine 10. In other embodiments, the signal interval measurement system 45 may require a specific type of remote input signal before determining that the remote control operator is exercising sufficient control over the machine 10. If a new remote input signal has been generated at stage 61 that is sufficient for the signal interval measurement system 45 to determine that the remote control operator is exercising sufficient control over the machine 10, the controller 36 may be configured to continue to move machine 10 at stage 62 based upon the continued propulsion commands generated at stage 60. In some instances, a new remote control signal may be received but such signal does not indicate that the operator is exercising sufficient control over the machine 10. In such case, the signal interval measurement system 45 may ignore the new remote control signal and the system operates according to the flowchart as if a remote control signal has not been received.

If a new remote input signal has not been generated at stage 61 that is sufficient for the signal interval measurement system 45 to determine that the remote control operator is exercising sufficient control over the machine 10, the controller 36 may determine or calculate at stage 63 the interval since receiving the previous remote input signal. The controller 36 may determine at decision stage 64 whether the interval exceeds the applicable input signal absence threshold. If the interval does not exceed the relevant input signal absence threshold, the controller 36 may continue to move machine 10 at stage 62 based upon the continued propulsion commands generated at stage 60.

If the interval exceeds the relevant input signal absence threshold at decision stage 64, the controller 36 may generate at stage 65 one or more change of operation commands to take one or more actions. In one embodiment, the machine 10 may be stopped. In another embodiment, propulsion of the machine 10 may initially be reduced or slowed down and eventually stopped if a second input signal absence threshold is met. In another embodiment, autonomous safety systems such as a change in terrain or crest detection system may be activated or the sensitivity increased while propulsion of the machine 10 continues.

In any embodiment, the change in operation command may be an alert signal generated to inform the remote control operator that the input absence threshold has been exceeded. The alert signal may be in the form of a visual alert at the remote control unit 130 such as flashing lights or images on a display at the remote control unit. In another example, the alert signal may include an audible alert such as an alarm at the remote control unit 130. In still another example, alert signal may include generating a sensory alert such as vibrating a seat or joystick 25 of the remote control unit 130. The signal interval measurement system 45 may incorporate any combination of alerts.

In addition, if desired, the signal interval measurement system 45 may be configured to send a warning to the remote control operator to warn or alert the operator that a new remote input signal has not been received and that the input signal absence threshold is approaching. The remote control operator then may take actions necessary to generate a new remote input signal so that the machine 10 will continue to operate without interruption.

INDUSTRIAL APPLICABILITY

The industrial applicability of the system described herein will be readily appreciated from the forgoing discussion. The foregoing discussion is applicable to machines 10 that are operated by remote control and may continue to move (such as semi-autonomously) in a desired manner without additional specific instructions from the remote control operator. Such system may be used at a mining site, a landfill, a quarry, a construction site, a roadwork site, a forest, a farm, or any other area in which movement of a machine is desired.

As an operator provides instructions or commands to machine 10 through remote control unit 130, the controller 36 provides signals to propel or otherwise move the machine about the work site 100. The remote control unit 130 may be configured so that continued actuation or displacement of an input device such as a joystick 138 is not necessary to maintain the propulsion of the machine. As an example, an operator may displace the joystick 138 in a desired manner to begin propulsion of the machine 10. The controller 36 will continue to propel the machine in the desired manner based upon the original propulsion command even in the absence of subsequent propulsion instructions.

To ensure that an operator maintains control over the machine 10 and to reduce the risk that the machine will move into an undesired location, controller 36 may include a signal interval measurement system 45. The signal interval measurement system 45 monitors the generation of input signals by the remote control unit 130 and determines whether the operator is maintaining sufficient control over the machine 10. To do so, the signal interval measurement system 45 may monitor the remote control unit 130 to determine whether the operator has taken certain actions that indicate that the operator is sufficiently focused on the remote control of the machine 10. For example, the signal interval measurement system 45 may monitor movement of controls or input devices at the remote control unit 130 since certain activities at the remote control unit, such as movement of joysticks 138 or other input devices, would suggest that the operator is focused on operating the machine 10. Other activities at the remote control unit 130 may also be used as indicators of the operator's focus on the machine such as monitoring the position of the operator's eyes.

The signal interval measurement system 45 may monitor the generation of input signals at the remote control unit 130 and compare the interval between the generation of input signals to an input signal absence threshold. If the interval exceeds the input signal absence threshold, the signal interval measurement system 45 may generate a change of operation command. In one example, the change of operation command may result in the immediate stoppage of the machine 10. In another example, the change of operation command may slow the machine 10 and may ultimately stop the machine. In still another example, sensitivity of certain systems on the machine 10 may change.

The extent of the signal absence may be measured in one or more manners including the length of time of the absence and/or the distance the machine 10 has moved during the absence. The controller 36 may be configured to utilize different input signal absence thresholds based upon the mode of operation of the machine or the position of the machine 10 within the work site 100. As a result, the controller 36 may be configured to stop or reduce the speed of the machine 10 based upon perceived risks and other factors associated with the specific operation or position of the machine. By utilizing different input signal absence thresholds, the efficiency and safety of the operation of the machine 10 may be increased.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for remotely operating a machine comprising:
   a remote control unit located remote from the machine, the remote control unit including a plurality of remote control input devices for generating a plurality of remote input signals, one of the plurality of remote control input devices being a propulsion input device for generating a propulsion signal;
   a transmitter remote from the machine for transmitting the plurality of remote input signals;
   a receiver at the machine for receiving a plurality of remote input signals; and
   a controller configured to:
      store an input signal absence threshold;
      generate an operator generated propulsion command to propel the machine based upon the propulsion signal from the propulsion input device;
      generate continued propulsion commands based upon the operator generated propulsion command to continue to propel the machine without receiving additional propulsion signals from the propulsion input device;
      determine an interval since generating a previous remote input signal at the remote control unit; and
      generate a change in operation command signal upon the interval since generating the previous remote input signal exceeding the input signal absence threshold.

2. The system of claim 1, wherein the previous remote input signal is the propulsion signal.

3. The system of claim 1, wherein the previous remote input signal is an input signal indicative of a command from any of the plurality of remote input devices other than the propulsion input device.

4. The system of claim 1, wherein the remote control unit includes a point of view display and an eye position sensor for generating positive eye position signals indicative of an operator looking at the point of view display and the controller is further configured respond to receipt of a positive eye position signal as generation of a remote input signal.

5. The system of claim 1, wherein the interval and signal absence threshold are time based.

6. The system of claim 1, wherein interval and signal absence threshold are distance based.

7. The system of claim 1, wherein the interval and signal absence are velocity based.

8. The system of claim 1, wherein the change in operation command includes generating a visual alert at the remote control unit.

9. The system of claim 1, wherein the change in operation command includes generating an audible alert at the remote control unit.

10. The system of claim 1, wherein the change in operation command includes generating a sensory alert at the remote control unit.

11. The system of claim 1, wherein the controller is further configured to stop movement of the machine upon the interval exceeding the input signal absence threshold.

12. The system of claim 1, wherein the remote control unit is a remote control console and the plurality of remote input signals are remote control input signals based upon manual movement of a remote input device at the remote control console by an operator.

13. The system of claim 1, further including a position sensor associated with the machine for generating position signals indicative of a position of the machine, and the controller is further configured to store a plurality of input signal absence thresholds, determine the position of the machine based upon the position signals, and select an input signal absence threshold based upon the position of the machine.

14. The system of claim 13, wherein the controller is configured to store a map of a work area including a first operating zone, and the controller is configured to select a first input signal absence threshold when the machine is within the first operating zone and select a second input signal absence threshold when the machine is outside of the first operating zone.

15. The system of claim 13, wherein the controller is further configured to determine a mode of operation of the machine and determine the input signal absence threshold based upon the mode of operation.

16. A controller-implemented method of remotely operating a machine comprising:
   storing an input signal absence threshold;
   generating an operator generated propulsion command to propel the machine based upon a propulsion signal from a propulsion input device of a remote control unit located remote from the machine;
   generating continued propulsion commands based upon the operator generated propulsion command to continue to propel the machine without receiving additional propulsion signals from the propulsion input device;
   determining an interval since generating a previous remote input signal with any of a plurality of remote control input devices at the remote control unit; and
   generating a change in operation command signal upon the interval since generating the previous remote input signal exceeding the input signal absence threshold.

17. The method of claim 16, wherein the previous remote input signal is the propulsion signal.

18. The method of claim 16, wherein the previous remote input signal is an input signal indicative of a command from any of the plurality of remote input devices other than the propulsion input device.

19. The method of claim 16, further including generating positive eye position signals indicative of an operator looking at a point of view display and t responding to receipt of the positive eye position signal as generation of a remote input signal.

20. A machine and remote control system, comprising:
   a drivetrain for causing movement of the machine;
   a remote control unit located remote from the machine, the remote control unit including a plurality of remote control input devices for generating a plurality of remote input signals, one of the plurality of remote control input devices being a propulsion input device for generating a propulsion signal;
   a transmitter remote from the machine for transmitting the plurality of remote input signals;
   a receiver at the machine for receiving a plurality of remote input signals; and
   a controller configured to:
      store an input signal absence threshold;
      generate an operator generated propulsion command to propel the machine based upon the propulsion signal from the propulsion input device;
      generate continued propulsion commands based upon the operator generated propulsion command to continue to propel the machine without receiving additional propulsion signals from the propulsion input device;
      determine an interval since generating a previous remote input signal at the remote control unit; and generate a change in operation command signal upon the interval since generating the previous remote input signal exceeding the input signal absence threshold.

* * * * *